United States Patent
Baikie

(10) Patent No.: US 8,033,919 B2
(45) Date of Patent: Oct. 11, 2011

(54) ELASTIC SHAFT COUPLING HAVING NON-IDENTICAL RUBBER BODIES

(75) Inventor: John Baikie, Doersten (DE)

(73) Assignee: Hackforth GmbH, Herne (DE)

( * ) Notice: Subject to any disclaimer, the term of this patent is extended or adjusted under 35 U.S.C. 154(b) by 355 days.

(21) Appl. No.: 12/226,075

(22) PCT Filed: Apr. 5, 2007

(86) PCT No.: PCT/EP2007/003081
§ 371 (c)(1), (2), (4) Date: Dec. 2, 2008

(87) PCT Pub. No.: WO2007/115783
PCT Pub. Date: Oct. 18, 2007

(65) Prior Publication Data
US 2009/0264207 A1 Oct. 22, 2009

(30) Foreign Application Priority Data
Apr. 8, 2006 (DE) .................. 10 2006 016 651

(51) Int. Cl.
*F16D 3/12* (2006.01)
(52) U.S. Cl. .................... 464/95; 464/96; 464/903
(58) Field of Classification Search ............ 464/18, 464/20, 51, 87, 88, 92, 93, 96, 98, 99, 147, 464/903, 91, 94, 95; 403/220, 223, 225, 403/228
See application file for complete search history.

(56) References Cited

U.S. PATENT DOCUMENTS

| 2,207,496 | A | | 7/1940 | Anderson, Jr. | |
|---|---|---|---|---|---|
| 2,462,825 | A | * | 2/1949 | Zimmerman et al. | 464/96 |
| 2,910,843 | A | * | 11/1959 | Happ et al. | 464/96 |
| 2,973,633 | A | * | 3/1961 | Hall | 464/96 |
| 3,023,593 | A | | 3/1962 | Nallinger | |
| 4,708,514 | A | * | 11/1987 | Walter et al. | 464/96 |
| 4,929,115 | A | * | 5/1990 | Lunke et al. | 464/96 |
| 5,066,263 | A | * | 11/1991 | Lunke et al. | 464/96 |
| 6,234,903 | B1 | | 5/2001 | Walter et al. | |
| 6,361,443 | B1 | | 3/2002 | Walter et al. | |
| 6,953,399 | B2 | * | 10/2005 | Kirschey | 464/92 |

FOREIGN PATENT DOCUMENTS

| DE | 823080 C1 * | 7/1949 | 464/95 |
|---|---|---|---|
| DE | 197 03 936 | 8/1998 | |
| DE | 197 14 420 | 10/1998 | |
| GB | 2 238 101 | 5/1991 | |

* cited by examiner

*Primary Examiner* — Gregory Binda
*Assistant Examiner* — Josh Skroupa
(74) *Attorney, Agent, or Firm* — Collard & Roe, P.C.

(57) ABSTRACT

An elastic shaft coupling has a drive-side interface and an output-side mechanical interface. Both interfaces are intended in each case for connecting the shaft coupling to an adjacent machine element. The shaft coupling has at least two elastic rubber elements which are connected behind one another between the drive-side and the output-side interfaces and the axial material thickness of which increases in each case at a growing radial spacing from the center axis of the shaft coupling. To reduce the amount of rubber of the shaft coupling with retention of its elastic properties, the respective rubber elements are of non-uniform configuration with regard to their torsional rigidity and to be precise are so non-uniform that the torsional rigidity of one of the two rubber elements is always at least one and a half times as great as the torsional rigidity of the other rubber element.

6 Claims, 2 Drawing Sheets

ELASTIC SHAFT COUPLING HAVING NON-IDENTICAL RUBBER BODIES

CROSS REFERENCE TO RELATED APPLICATIONS

This application is the National Stage of PCT/EP2007/003081 filed on Apr. 5, 2007, which claims priority under 35 U.S.C. §119 of German Application Ser. No. 10 2006 016 651.5 filed on Apr. 8, 2006. The international application under PCT article 21(2) was not published in English.

BACKGROUND OF THE INVENTION

1. Field of the Invention

The present invention relates to an elastic shaft coupling having a mechanical interface on the drive side and on the power take-off side, both interfaces for connecting the shaft coupling to an adjacent machine element, in each instance, whereby the shaft coupling has at least two elastic rubber bodies placed one behind the other between the interface on the drive side and on the power take-off side, whose axial material thickness increases with an increasing radial distance from the center axis of the shaft coupling, in each instance.

2. The Prior Art

Such a shaft coupling is known from the German Offenlegungsschrift [examined patent published for public scrutiny] DE 197 14 420 A1 of the same applicant.

Elastic shaft couplings of the type stated initially serve to damp rotary vibrations in drive trains. Furthermore, they even out radial and axial offset of individual sections of the drive train, relative to one another. For example, the transmission of a ship is generally mounted in fixed manner, while the ship diesel is mounted elastically. The offset of the engine resulting from vibrations and hull deformations is compensated by means of an elastic shaft coupling that is disposed between engine and transmission. Furthermore, the elastic shaft coupling damps rotary vibrations that occur in the system.

The elastic rubber bodies of such couplings have the form of a rotation body, the rotation surface of which is approximately V-shaped. Because of this geometry, the axial material thickness of the rubber increases with an increasing radial distance from the center axis of the shaft coupling, in order to guarantee a uniform stress distribution within the rubber body, over its entire diameter.

In the selection of the coupling for the predetermined drive train, the individual torsion spring constants and mass inertia moments of the rubber bodies and their flanking disks are significant parameter values. In order to vary these, in terms of design, in the past the increase in material thicknesses of the rubber bodies was changed, as were the material-specific spring constants. However, in this connection the axial material thicknesses of the rubber bodies were always varied in identical measure, and this led to the result that the rubber bodies always appear with mirror symmetry in a mirror plane perpendicular to the center axis of the shaft coupling. Since the same material was also always provided for the two rubber bodies, this led to the result, in the final analysis, that the torsion spring constants of the individual rubber bodies were approximately identical. The amount of rubber resulting from this was accepted as being a given.

SUMMARY OF THE INVENTION

However, the amount of rubber represents a significant cost factor of a shaft coupling. In order to lower its price, the present invention is based on the task of reducing the amount of rubber of a shaft coupling of the type stated initially, while maintaining its elastic properties.

This is accomplished, surprisingly, in that the rubber bodies, in each instance, are structured to be non-identical with regard to their torsional stiffness, in other words their quotient of moment of torsion and angle of torsion, specifically in such a manner that the torsional stiffness of one of the two rubber bodies is always at least one and a half times as great as the torsional stiffness of the other rubber body.

Turning away from having the torsional stiffness of the individual rubber bodies be equal opens up a new degree of freedom in sizing the coupling. This makes it possible to reduce the required total amount of rubber. The ratio of the spring stiffness values, in each instance, is dependent on the total "drive train" system, so that a generally valid sizing rule does not have to be given. However, it has been shown that the material savings possibilities are particularly great if the spring stiffness values deviate from one another by a factor of three.

The individual torsional spring stiffness of a rubber body is dependent, on the one hand, on the material-specific spring constant of the material, and, on the other hand, on the axial thickness of the rubber body. For a design implementation of the non-identical spring constants, it is first of all recommended to vary the axial thicknesses of the rubber bodies, specifically in such a manner that the axial material thickness of the softer of the two rubber bodies, at a radial distance, is always at least one and a half times as great as the axial material thickness of the harder rubber body, at the same radial distance from the center axis of the shaft coupling. A shaft coupling structured in this manner consequently does not have a mirror plane with reference to the rubber bodies placed one behind the other. The use of rubber can be significantly reduced by means of this measure.

This savings effect is promoted by the greatest possible non-equality of the material thicknesses. Thus, particularly good savings possibilities exist in the case of shaft couplings that have a rubber body that is always three times as thick as the other rubber body, radially towards the outside. The concrete ratio of the material thicknesses, however, depends on the other components of the drive train and their dynamic behaviors, so that no generally valid material thickness ratios can be given. However, the savings effects described only become noticeable starting with a ratio of 1.5.

Furthermore, it is recommended to structure the rubber bodies differently not only in terms of their geometry, but also with regard to their material-specific spring constants. Using additives, it is possible to vary the elasticity of the rubber within a certain band width. It is recommended to take this variable into consideration in designing the coupling, and to provide for different, material-specific spring constants.

Furthermore, the elastic properties of a rubber body can be varied by means of segmenting the same, in the circumferential direction. In this manner, a rubber body is formed that is composed of a plurality of segments, which extend over a certain angle section. Also, it is possible to perforate the rubber body axially, in order to optimize the ventilation of the rubber body.

BRIEF DESCRIPTION OF THE DRAWINGS

The present invention will now be explained in greater detail, using an exemplary embodiment. For this purpose, the drawing shows.

DETAILED DESCRIPTION OF THE PREFERRED EMBODIMENTS

Figure 1:
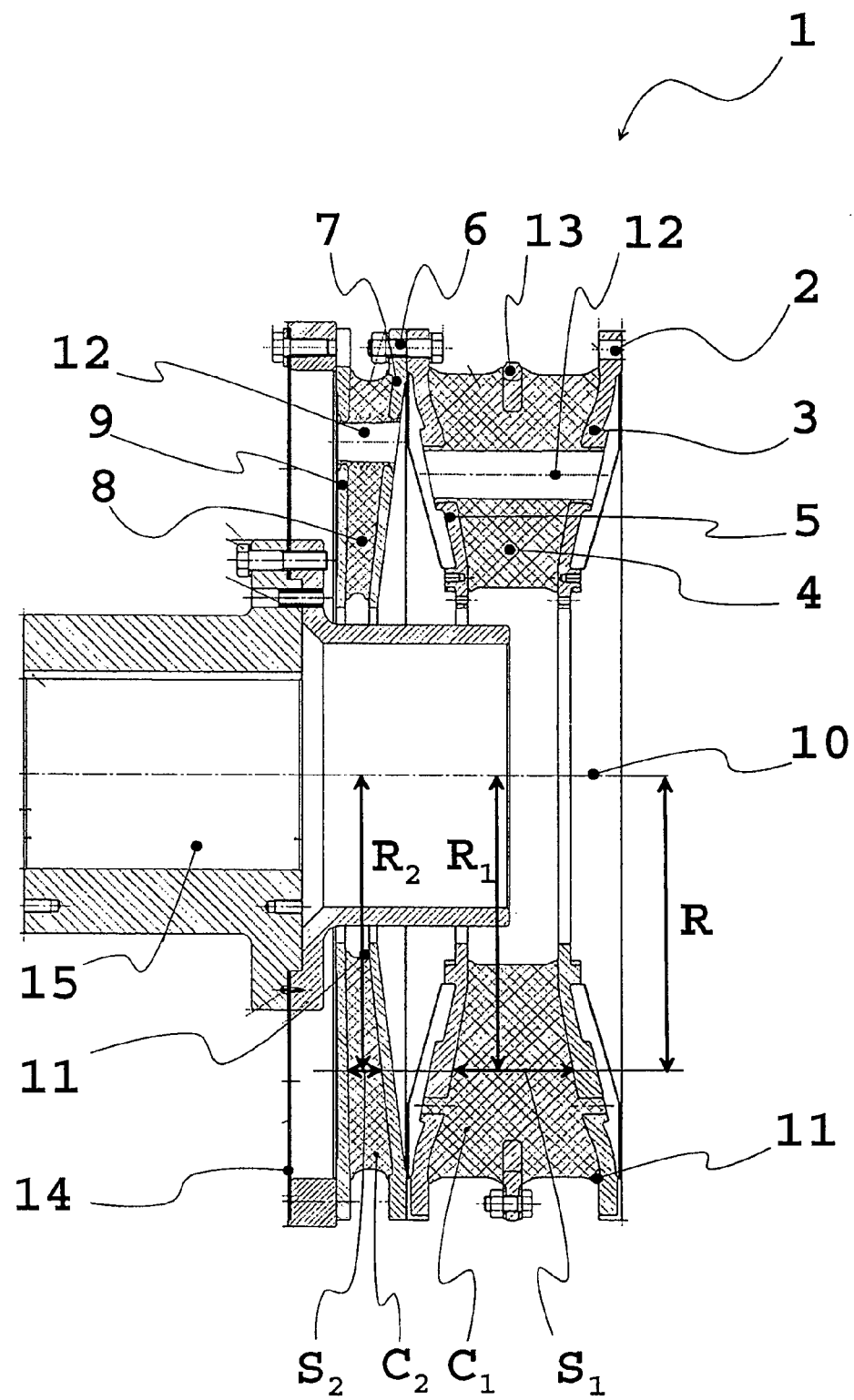
FIG. 1 shows a shaft coupling having two non-identical rubber bodies.
Figure 2:
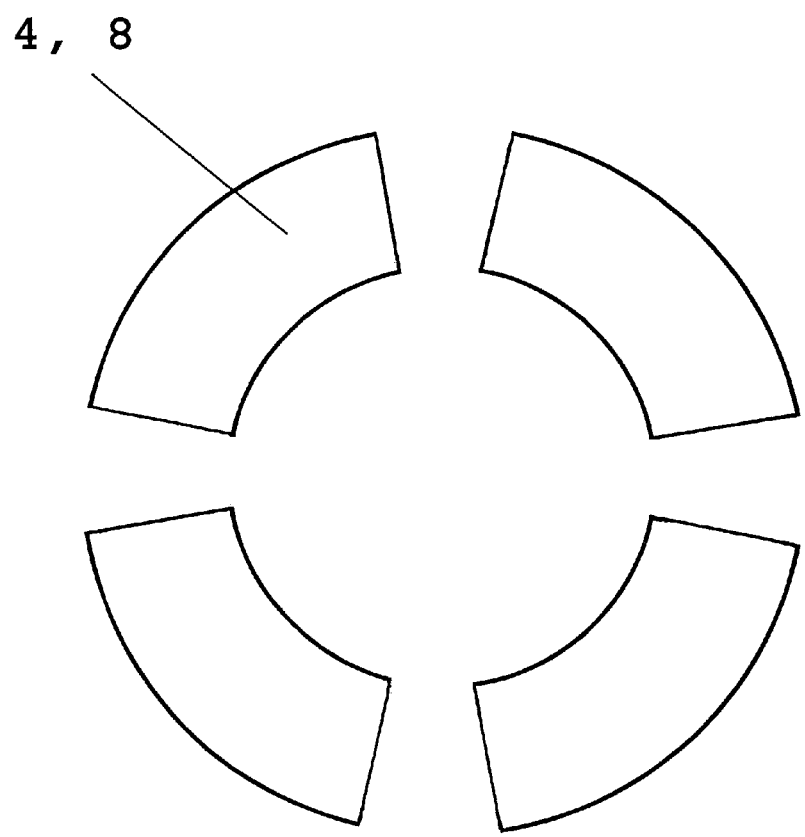
FIG. 2 shows a segmented rubber body.

The elastic shaft coupling 1 transfers the torque of an engine, not shown, from the right side of the shaft coupling 1 to a transmission, not shown, on the left side of the shaft coupling 1. For this purpose, the shaft coupling 1 has a mechanical interface 2 on the drive side, on the right side, in the form of a flange 2, onto which the engine shaft, not shown, is flanged. The flange 2 is an integral part of a first disk 3, onto which a first rubber body 4 is vulcanized. With its left flank, the rubber body 4 is vulcanized onto a second disk 5. The axial material thickness $S_1$ of the first rubber body 4 is the dimension between the two disks 3, 5 that flank the first rubber body 4.

The second disk 5 is screwed onto a third disk 7, onto which a second rubber body 8 is vulcanized, with a screw connection 6. This second rubber body 8 is delimited by a fourth disk 9 on its other flank.

The two rubber bodies 4, 8 differ significantly from one another with regard to their shape and their torsional stiffness. Thus, the axial material thickness $S_1$ of the first rubber body 4 is always three times as great as the axial material thickness $S_2$ of the second rubber body 8 at the same radial distance $R=R_1=R_2$. The axial material thickness $S_1$ and $S_2$ of the rubber bodies 4, 8 is understood to be the dimension between the flanking disks 3, 5 and 7, 9, respectively, which increases, in each instance, with the radial distance R from the center axis 10 of the shaft coupling 1. In the sense of the present utility model, the edge regions 11 of the rubber bodies 4, 8 and axial perforations 12, which serve for ventilation of the rubber bodies 4, 8, are not considered part of the material thickness. A support ring 13 vulcanized into the first rubber body 4 is insignificant for dimensioning the axial material thickness $S_1$ of the first rubber body 4 in the outer edge region.

The extreme difference in the axial material thicknesses $S_1$ and $S_2$ leads to the result that the torsion stiffnesses $C_1$ and $C_2$ of the rubber bodies 4, 8 are also different. Since the stiffness decreases with the amount of rubber used, the torsion stiffness $C_2$ of the second, narrower rubber body 8 is about three times as great as the torsion stiffness $C_1$ of the wider, first rubber body 4. The ratio of $C_2$ to $C_1$ and $S_1$ to $S_2$ amounts to three, in each instance, since the same rubber material having the same material-specific spring constant was used. The use of types of rubber having different additives opens up another parameter for optimizing the total rubber volume.

A membrane spring 14 is screwed onto the fourth disk 9, and transfers the torque on to a hub 15, which serves as a mechanical interface 15 on the power take-off side. An input shaft of a transmission is inserted into the hub 15.

In the case of the shaft coupling 1 shown, the two rubber bodies 4, 8 serve for damping rotary vibrations. At the same time, the first rubber body 4 evens out radial offset of the elastically suspended engine relative to the transmission, which is set up fixed in place. This is accomplished by means of a comparatively great axial material thickness $S_1$. The second rubber body 8 has an axial material thickness $S_2$ that is less by a factor of 3, and for this reason, it is harder in the axial direction than the first rubber body 4, and therefore compensates hardly any radial offset. The membrane spring 14 is stiff in the circumferential and radial direction, and evens out axial displacements between the mechanical interface 2 (flange) on the drive side and the mechanical interface 15 (hub) on the power take-off side.

In comparison with an elastic shaft coupling having the same dynamic properties and symmetrical rubber bodies, the present coupling has clearly less rubber mass.

The invention claimed is:

1. Elastic shaft coupling having a mechanical interface on the drive side and a mechanical interface on the power take-off side, both interfaces for connecting the shaft coupling to an adjacent machine element, in each instance, whereby the shaft coupling has at least two elastic rubber bodies placed one behind the other between the interface on the drive side and the interface on the power take-off side, whose axial material thickness increases with an increasing radial distance from the center axis of the shaft coupling, in each instance, wherein the torsional stiffness of one of the two rubber bodies is at least one and a half times as great as the torsional stiffness of the other rubber body, and wherein the axial material thickness of one of the two rubber bodies, at a radial distance, is always at least one and a half times as great as the axial material thickness of the other rubber body, at the same radial distance.

2. Elastic shaft coupling according to claim 1, wherein the torsional stiffness of one of the two rubber bodies is at least three times as great as the torsional stiffness of the other rubber body.

3. Elastic shaft coupling according to claim 1, wherein the axial material thickness of one of the two rubber bodies, at a radial distance, is always at least three times as great as the axial material thickness of the other rubber body, at the same radial distance.

4. Elastic shaft coupling according to claim 1, wherein the material of the one rubber body has a different specific spring stiffness than the material of the other rubber body.

5. Elastic shaft coupling according to claim 1, wherein at least one of the rubber bodies is segmented in a circumferential direction.

6. Elastic shaft coupling according to claim 1, wherein at least one of the rubber bodies is perforated.

* * * * *